United States Patent
Boykin et al.

(10) Patent No.: US 8,694,905 B2
(45) Date of Patent: Apr. 8, 2014

(54) MODEL-DRIVEN DISPLAY OF METRIC ANNOTATIONS ON A RESOURCE/RELATIONSHIP GRAPH

(75) Inventors: J. Russell Boykin, Pflugerville, TX (US); Alberto Giammaria, Austin, TX (US); Patricia Diana Griffin, Austin, TX (US); Robert Lee Orr, Raleigh, NC (US); Christopher Andrew Peters, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 12/481,610

(22) Filed: Jun. 10, 2009

(65) Prior Publication Data

US 2010/0318931 A1    Dec. 16, 2010

(51) Int. Cl.
*G06F 3/01*        (2006.01)
*G06F 3/00*        (2006.01)

(52) U.S. Cl.
USPC ............ 715/771; 715/853; 715/230; 715/734; 715/735; 715/736; 345/440

(58) Field of Classification Search
USPC .................... 715/853, 734–736, 230; 345/440
See application file for complete search history.

(56) References Cited

U.S. PATENT DOCUMENTS

| | | | |
|---|---|---|---|
| 5,261,044 A | | 11/1993 | Dev et al. |
| 5,276,789 A | * | 1/1994 | Besaw et al. .................. 345/440 |
| 5,619,632 A | * | 4/1997 | Lamping et al. .............. 345/441 |
| 5,664,133 A | * | 9/1997 | Malamud et al. ............. 715/816 |
| 5,684,967 A | * | 11/1997 | McKenna et al. ............. 715/853 |
| 6,112,015 A | | 8/2000 | Planas et al. |
| 6,966,033 B1 | * | 11/2005 | Gasser et al. ................. 715/738 |
| 7,103,843 B2 | | 9/2006 | Hand et al. |
| 7,315,985 B1 | * | 1/2008 | Gauvin et al. ................. 715/734 |
| 7,711,813 B1 | * | 5/2010 | Yehuda et al. ................. 709/224 |
| 2002/0147805 A1 | * | 10/2002 | Leshem et al. ................ 709/223 |
| 2002/0156884 A1 | * | 10/2002 | Bertram et al. ............... 709/224 |
| 2003/0006988 A1 | * | 1/2003 | Alford et al. .................. 345/440 |
| 2003/0177176 A1 | * | 9/2003 | Hirschfeld et al. ........... 709/203 |

(Continued)

OTHER PUBLICATIONS

"Service Availability Management: An Integrated Solution for Performance and Event Management of Services", CA Green Books, Computer Associates, 2007, pp. 1-276. http://supportconnectw.ca.com/public/ca_common_docs/greenbooks/CA006_35_SerAvailMgmtGreenBook_ENU_041707.pdf.

(Continued)

*Primary Examiner* — Amy Ng
*Assistant Examiner* — Toan Vu
(74) *Attorney, Agent, or Firm* — Yee & Associates, P.C.; Jeffrey S. LaBaw

(57) ABSTRACT

A model-driven display for displaying metric annotations on a resource/relationship graph. Upon detecting selection of a set of computer resources in a system management graph, annotation options available to the selected set of computer resources are retrieved from an object model, wherein the object model defines computer resources in a data processing system and relationships among the computer resources, and wherein the annotation options represent resource metrics collected for the computer resources, A menu is created using the annotation options for the selected set of computer resources and displayed to a user in the graphical user interface. When selection of a set of annotation options in the menu is detected, the system management graph is updated to display annotations, corresponding to the selected set of annotation options, for the selected set or computer resources. The updated system management graph is then displayed to the user in the graphical user interface.

20 Claims, 9 Drawing Sheets

(56) References Cited

U.S. PATENT DOCUMENTS

| | | |
|---|---|---|
| 2005/0050196 A1 | 3/2005 | Aita et al. |
| 2005/0050471 A1* | 3/2005 | Hallisey et al. ............... 715/734 |
| 2005/0219151 A1* | 10/2005 | Li et al. ............................. 345/7 |
| 2006/0130034 A1* | 6/2006 | Beisiegel et al. ............. 717/166 |
| 2006/0277317 A1* | 12/2006 | Clark et al. .................... 709/235 |
| 2007/0067296 A1* | 3/2007 | Malloy et al. ...................... 707/8 |
| 2007/0073674 A1* | 3/2007 | McVeigh et al. .................. 707/4 |
| 2007/0198542 A1* | 8/2007 | Morris ........................... 707/100 |
| 2007/0277111 A1 | 11/2007 | Bennett et al. |
| 2008/0172629 A1 | 7/2008 | Tien et al. |
| 2008/0263150 A1 | 10/2008 | Childers et al. |
| 2008/0320120 A1* | 12/2008 | Arwe et al. .................... 709/223 |
| 2009/0125846 A1* | 5/2009 | Anderson et al. ............. 715/853 |
| 2010/0064039 A9* | 3/2010 | Ginter et al. .................. 709/224 |

OTHER PUBLICATIONS

"NetworkIT", Administrator Guide 2.0, Computer Associates, 2000, pp. 1-194. ftp://ftp.ca.com/CAproducts/unicenter/networkit/manuals/netwk_20/AdminGde.pdf.

"WhatsUp Gold", User's Guide, Software Version 7, Ipswitch, Inc., 2001, pp. 1-236. http://ftp.ipswitch.com/ipswitch/manuals/wug7.pdf.

\* cited by examiner

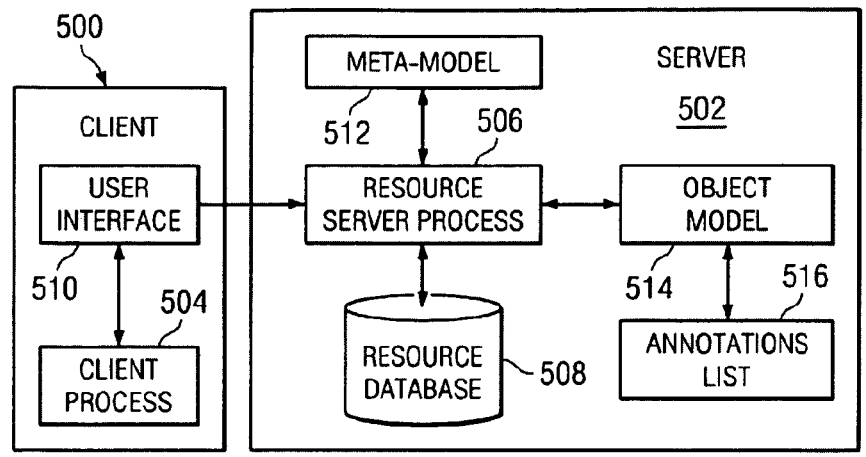
FIG. 5
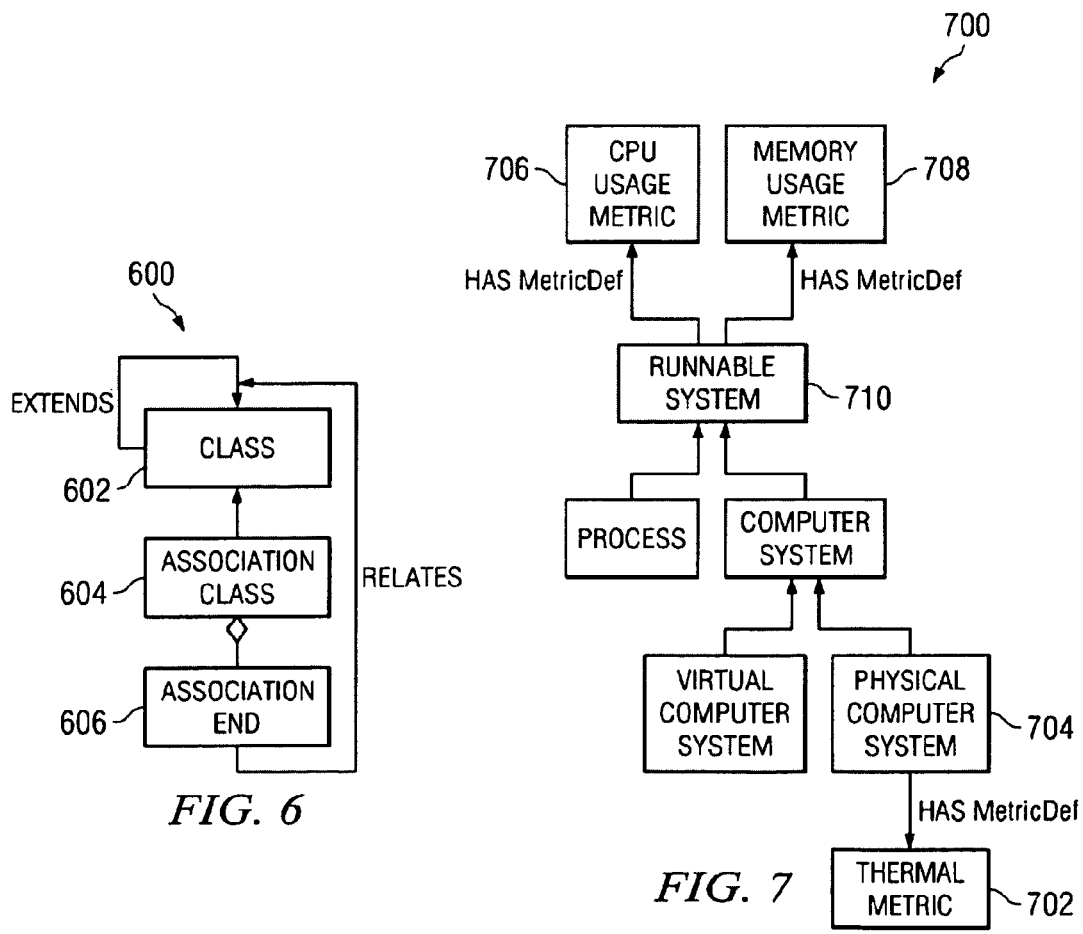
FIG. 6
FIG. 7

MODEL-DRIVEN DISPLAY OF METRIC ANNOTATIONS ON A RESOURCE/RELATIONSHIP GRAPH

BACKGROUND

1. Field

The disclosure relates generally to an improved data processing system, and more specifically to a model-driven display of metric annotations on a resource/relationship graph.

2. Description, of the Related Art

Enterprise management systems are network management systems capable of managing devices, independent of vendors and protocols, in Internet Protocol (IP)-based enterprise networks. Enterprise management systems can be very complex and difficult to manage, as a data center within, an enterprise may contain thousands of resources, and each resource may have many different relationships to other resources in the data center. In order to successfully manage such a data center, an administrator is required to understand the resources that are relevant for a particular system management task (e.g., the root cause analysis of a performance problem), relationships among the relevant resources, resource configuration information, and monitored data about the relevant resource. A common approach used for managing, monitoring and solving problems in an enterprise environment is to display resources and relationships on a topology graph. Configuration data or metric values for a particular resource may be provided to the user when, the user selects die resource in the graph.

SUMMARY

According to one embodiment of the disclosure, a model-driven display is provided for displaying metric annotations on a resource/relationship graph. When a set of computer resources is selected in a system management graph in a graphical, user interface, the embodiments of the disclosure retrieve annotation options available to the selected set of computer resources from an object model, wherein the object model defines computer resources in a data processing system and relationships among the computer resources, and wherein the annotation options represent resource metrics collected for the set of computer resources. A menu is created using the annotation options for the selected set of computer resources and displayed to a user in the graphical user interface. When selection of a set of annotation options in the menu is detected, the system management graph is updated to display annotations, corresponding to the selected set of annotation options, for the selected set or computer resources. The updated system management graph is then displayed to the user in the graphical user interface.

BRIEF DESCRIPTION OF THE SEVERAL VIEWS OF THE DRAWINGS

FIG. 5 is a block diagram of an exemplary enterprise environment in which the illustrative embodiments may be implemented;

FIG. 6 is an exemplary system management meta-model in accordance with, the illustrative embodiments;

FIG. 7 is an exemplary object model in accordance with the illustrative embodiments;

DETAILED DESCRIPTION

Figure 1:
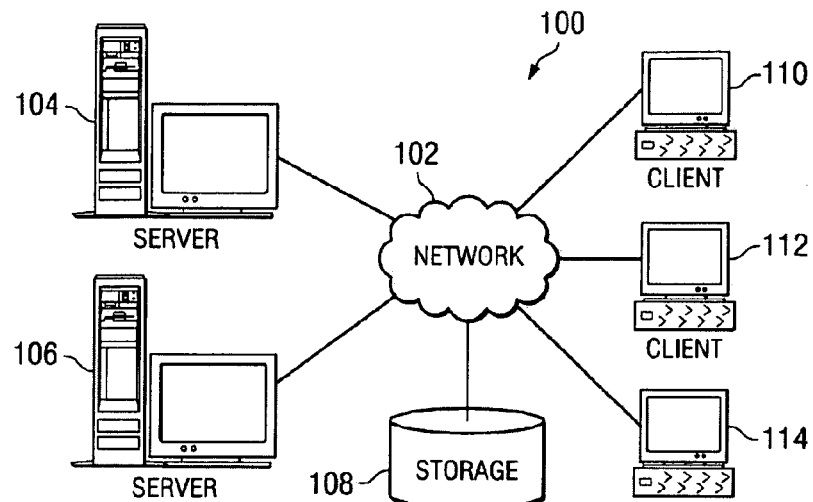
FIG. 1 depicts a pictorial representation of a distributed data processing system in which, the illustrative embodiments may be implemented.

As will be appreciated by one skilled in the art, the embodiments in the disclosure may be embodied as a system, method or computer program product. Accordingly, the embodiments in the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments in the disclosure may take the form of a computer program product embodied in any tangible medium of expression having computer usable program, code embodied in the medium.

Any combination, of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other mediums, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with, the computer-usable program code embodied therewith, either in baseband or as pan of a carrier wave. The computer usable program code may be transmitted using any appropriate medium, including but not limited to wireless, wireline, optical fiber cable, RF, etc.

Computer program code for carrying out operations of the embodiments in the disclosure may be written in any combination of one or more programming languages, including an object oriented, programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments in the disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means, for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/of block diagram block or blocks.

Figure 2:
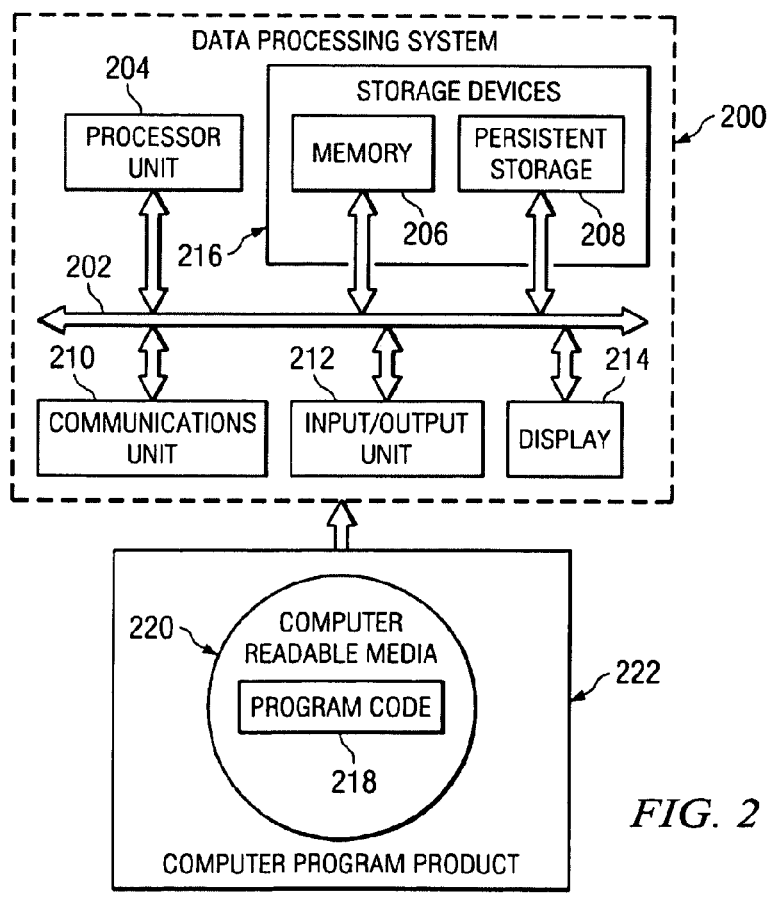
FIG. 2 is a block diagram of a data processing system in which, the illustrative, embodiments may be implemented.

With reference now to the figures and in particular with reference to FIGS. 1-2, exemplary diagrams of data processing environments are provided in which illustrative embodiments may be implemented. It should be appreciated, that FIGS. 1-2 are only exemplary and are not intended to assert or imply any limitation, with, regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which, is the medium used to provide communications links between various devices and computers connected together within network data processing system 1011. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network, computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium, on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 20b, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on die particular implementation. Further, processor unit 204 may be implemented using one or mare heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 298 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, hi these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs, may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing-system for use within data processing system 200. For instance, program code stored in a computer readable storage medium in a server data processing system may be downloaded over a network, from the server to data processing system 200. The data processing system providing program code 218 may be a server computer, a client computer, or some other device capable of storing and transmitting program code 218.

The different components illustrated for data, processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
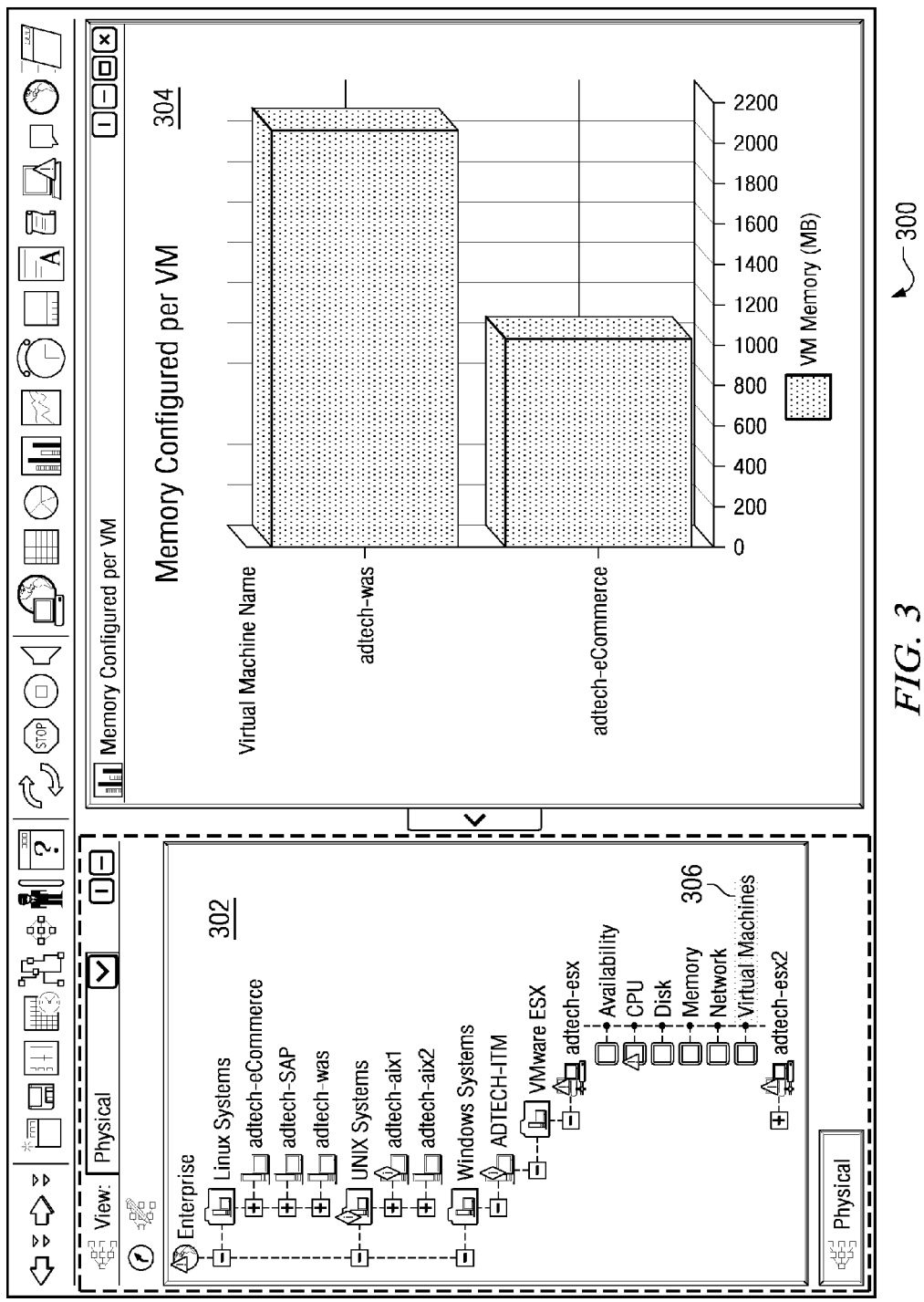
FIG. 3 illustrates a known system management user interface with a tree view.
Figure 4:
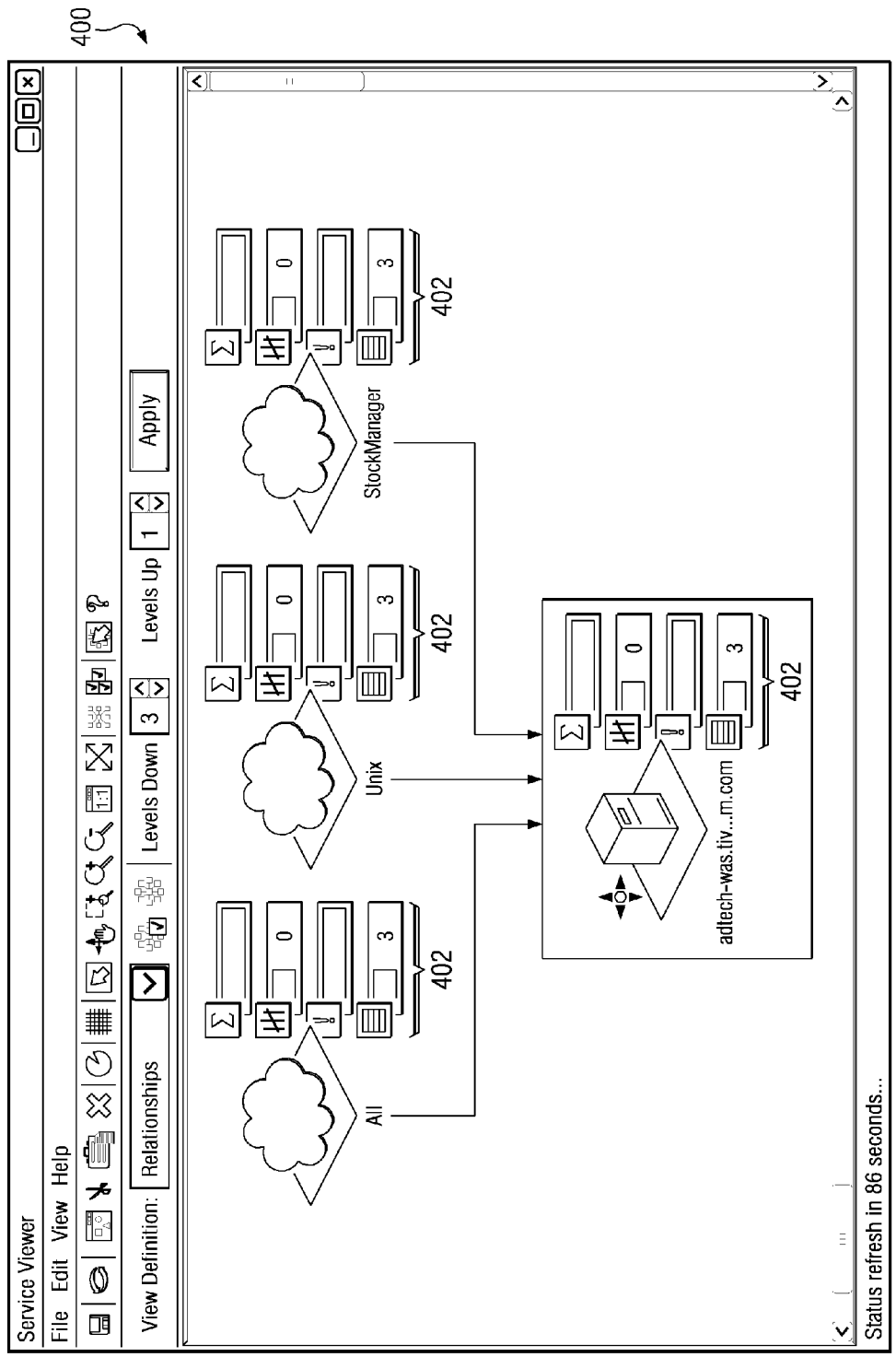
FIG. 4 illustrates a known system management user interface with an annotation view.

As previously mentioned, users may manage and monitor aspects of an enterprise environment using a system management graph. A system management graph displays resources and their relationships, and provides resource configuration data and/or metric values to the user when the user selects a particular resource, in the graph. FIG. 3 illustrates an example of a known user interface comprising a system management graph with a directory tree structure. When a user wants to cheek the metric values for a plurality of resources in the graph (e.g., resources shown in area 302), user interface 300 allow the user to view foe metric values on an individual resource basis. For example, the directory tree structure allows a user to select (in area 302) and view (in area 304) a set of metrics for one resource at a time (e.g., virtual machines resource 306). Thus, when the user wants to cheek, for example, the CPU and memory metric values for 10 machines, by the time the user selects and views the metrics for the 8th machine, the user may have forgotten the metric values of the previously-selected 7 machines. In order to view metric values simultaneously for a set of machines, a custom view must be created. However, building custom system management graphs can be very time consuming for volatile sets of resources. Another example of a known system management user interface is depicted in FIG. 4. User interface 400 comprises a system management graph that displays metric values of system resources using annotations 402. A metric annotation is a value and/or icon that is displayed on a graph and which is used to indicate a current operational status of an associated resource. An annotation comprises a metric type (e.g., CPU, memory, etc) and a value. The annotation, value is implementation specific, and may comprise numeric and/or symbolic form, such, as a graph, icon, text, and the like. The value may be a current value or a historic value (e.g., historic CPU usage up to the current time). Annotations 402 and their values are displayed on user interface 400 for one or more resources. However, the annotations shown to the user are static in nature, in that the same metric types are shown for each resource, regardless of the type of resource and whether a metric is applicable to the particular resource, in addition, the graph in user interface 400 comprises no relationships between different resource types, but rather only illustrates groups of resources and the aggregated states and any notifications for those groups (e.g., the graph illustrates that a particular application uses three Unix systems and that none of them are using more than 80% CPU.)

The illustrative embodiments provide a solution to the issues above by providing a method for displaying resource-specific metric annotations on a system management graph. The resource-specific annotations provided in the illustrative embodiments are supported by a generic meta-model that supports polymorphism, such that multiple possible annotation sets may be associated with a selected resource or group of resources in the enterprise system. Data for a system management graph is provided by an object model that defines resources in the enterprise system and their relationships, as well as resource-specific metric information. The object model maintains a list of possible annotations available for each type of resource. The annotations are used to represent the metric information associated with, the resources.

A system management user interface uses the object model to build the graph in a generic manner. The user may select a set of resources in the graph, wherein a set may comprise an individual resource or a group of resources. The user interface dynamically retrieves and provides the user with a menu comprising the list of possible annotations for the selected set of resources, A 'possible' annotation for a selected set of resources comprises any annotation that has a metric value for each resource in the set of resources that is available to be retrieved and displayed in the graph. The user interface determines the list of possible annotations to provide to the user based on the type of resource(s) selected, such that the annotation options provided to the user for one resource type in the enterprise may differ from the annotation options provided for another resource type. When presented with a menu comprising a list of possible annotations associated with the selected set of resources, the user may select one or more annotation options from the list to be displayed in the graph for the selected set of resources.

Once the user has selected the desired annotations to be shown in the graph, the graph is updated to display the selected annotations and may be used to monitor and manage the enterprise environment. The annotations indicate the current operational status for the selected set of resources, without requiring the user interface to have any knowledge of the resource type or annotations. Examples of annotations to be displayed in the graph include, but are not limited to, annotations that reflect the values of CPU, memory, or disk usage. Annotations may also be used to show the number of transactions flowing through applications or temperature values to indicate the thermal, health of individual computer systems represented in the graph. The annotations displayed in the user interface of the illustrative embodiments enable system administrators to have a clear idea of the metric values for multiple resources in the system, without requiring users to individually select resources in the graph to obtain metric information about each of the resources.

FIG. 5 is a block diagram of components used in providing a graphical display of resource information in an enterprise environment in accordance with tire illustrative embodiments. In this example, a user may view resource information for a network data processing system, through client 500. Client 500 is an example of clients 110, 112, and 114 in FIG. 1. Resource metrics may be obtained from server 502 in the illustrative examples. Server 502 is an example of servers 104 and 106 in FIG. 1. Client 500 includes client process 504, which may request the resource metrics from, resource server process 506.

Resource server process 506 obtains information regarding various resources and metrics that are of interest and stores that information in resource database 508. This information may include, for example, an identification of clusters, hosts, data stores, virtual machines, application servers, applications, data sources, etc., in addition to the relationships among the resources. Metrics that may be gathered for these resources include, but are not limited to, the operational level of a particular physical device, such as whether a server is operating in a normal mode, a warning mode, or a critical mode. Further, other metrics may include, for example, the capacity or amount of processing being performed by a particular resource. Some other metrics include for example, TCP/IP parameters including a high ping or response level and retransmission, of segments. Another metric that may be used includes low available memory or high, paging of data. Stopped or failed services are additional metrics. Metrics also include physical disk measurements that indicate a high percentage of disk time, a high transfer rate, a slow physical drive, and a high reading of bytes per second. Logical disk metrics include, for example, low disk space, amount of fragmentation, and slow logical drive response. A high print job error rate for a printer is yet another example of a metric that may be used.

Client process 504 receives this information from, resource server process 506 via user interface 510. Resource server process 506 uses generic meta-model 512 and object model 514 to determine the possible annotation options in annotations list 516 to be provided to a user for the selected set of resources in the system management graph in user interface 510. Client process 504 uses the resource information and the annotation options retrieved from resource server process 500 to update the resource information, resource relationship information, and the metric annotations displayed in the system management graph in user interface 510. System management graph in user interface 510 allows for viewing the entire system of resources, resource relationships, and associated resource metrics.

FIG. 6 is an exemplary system management meta-model in accordance with the illustrative embodiments. The user interface provided by the illustrative embodiments is supported by a system management meta-model such, as meta-model 600. Meta-model 600 is an example of meta-model 512 in FIG. 5. Meta-model 680 is shown in this example to comprise class 602, association class 684, and association ends 606. Class 602 represents one or more resource classes comprising child classes (subclasses) that may extend the parent classes (superclasses). Shared annotations are defined in the parent classes. A child, class may inherit common annotations from its parent class, while also providing its own annotations that override the inherited annotations.

Association class 604 models the connections or associations between instances of the associated class 602. Association class 604 may comprise many-to-one and many-to-many associations among resources, where the association itself has attributes. An association comprises at least two association ends 606, each specifying a connected class 602 and a set of properties which must be full filled for the relationship between resources to be valid.

FIG. 7 is an exemplary object model based on generic meta-model 680 in FIG. 6. Object model 700 is an example of object model 514 in FIG. 5. Object model 700 illustrates exemplary instantiated class objects in the management system and the relationships among them. Hie class objects may represent physical computer resources, such as hosts and servers, and non-physical resources, such as processes. Object model 700 also represents the metrics associated with the class objects, such as thermal metric 702 defined for physical, computer system object 704 or CPU usage metric 706 and memory usage metric 708 defined for runnable computer-system object 710. The user interface in die illustrative embodiments may build the system management graph of an enterprise management system by calling an application programming interface (API) provided, by object, model 700. Object model 700 maintains a list of annotations available for each type of class object.

Figure 8:
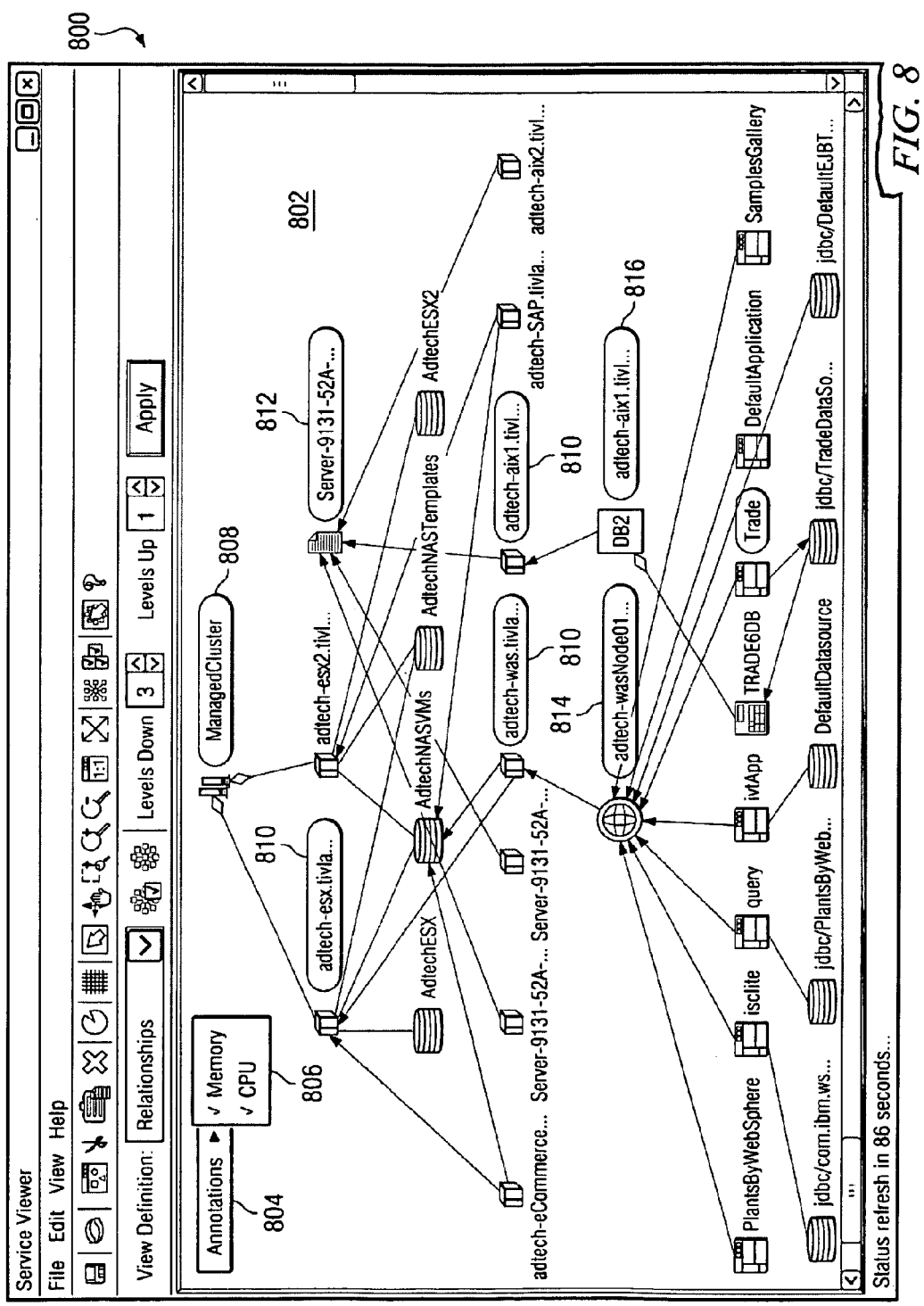
FIGS. 8-10 illustrate an exemplary user interface comprising a system management graph in accordance with the illustrative embodiments.
Figure 9:
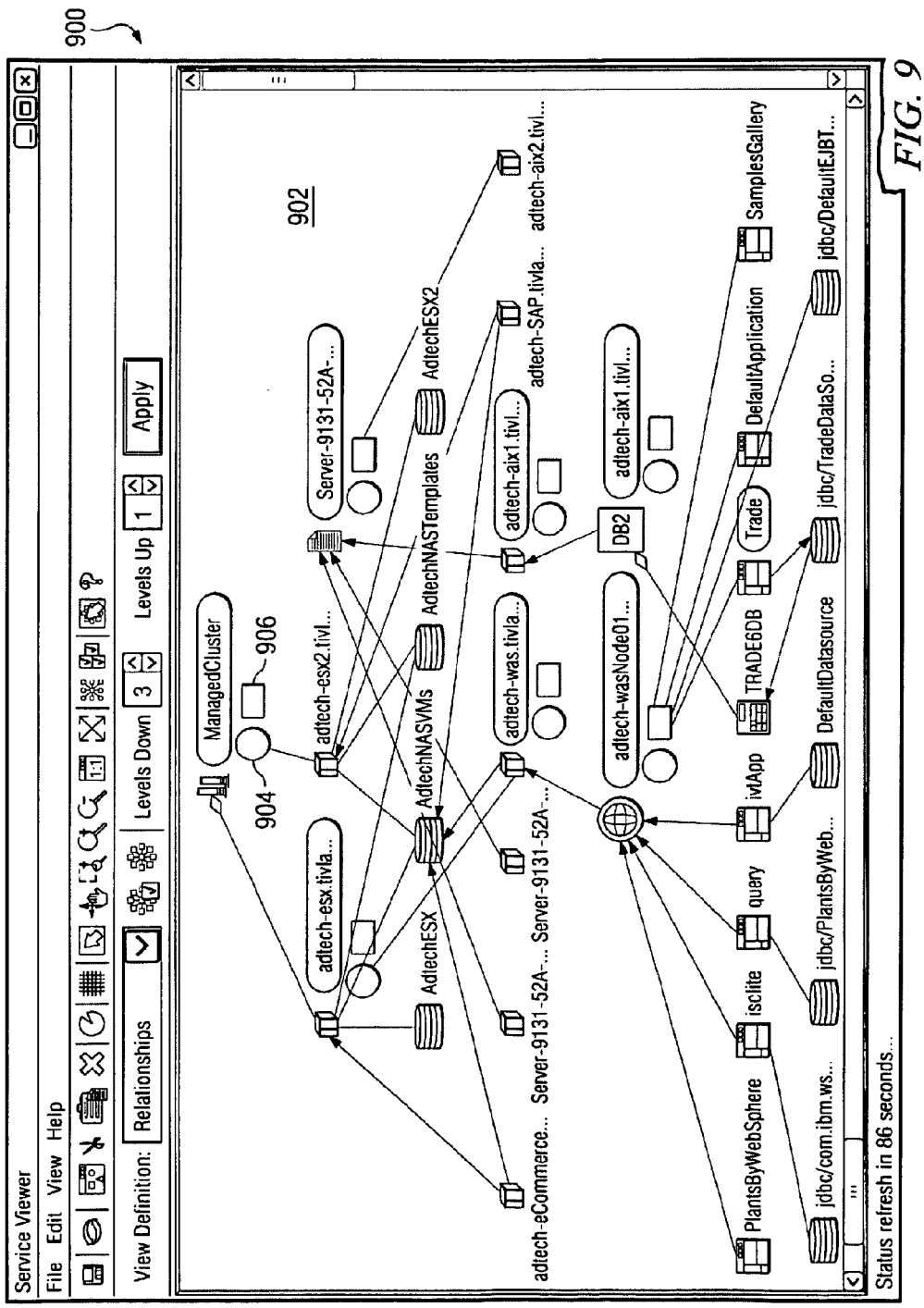
Figure 10:
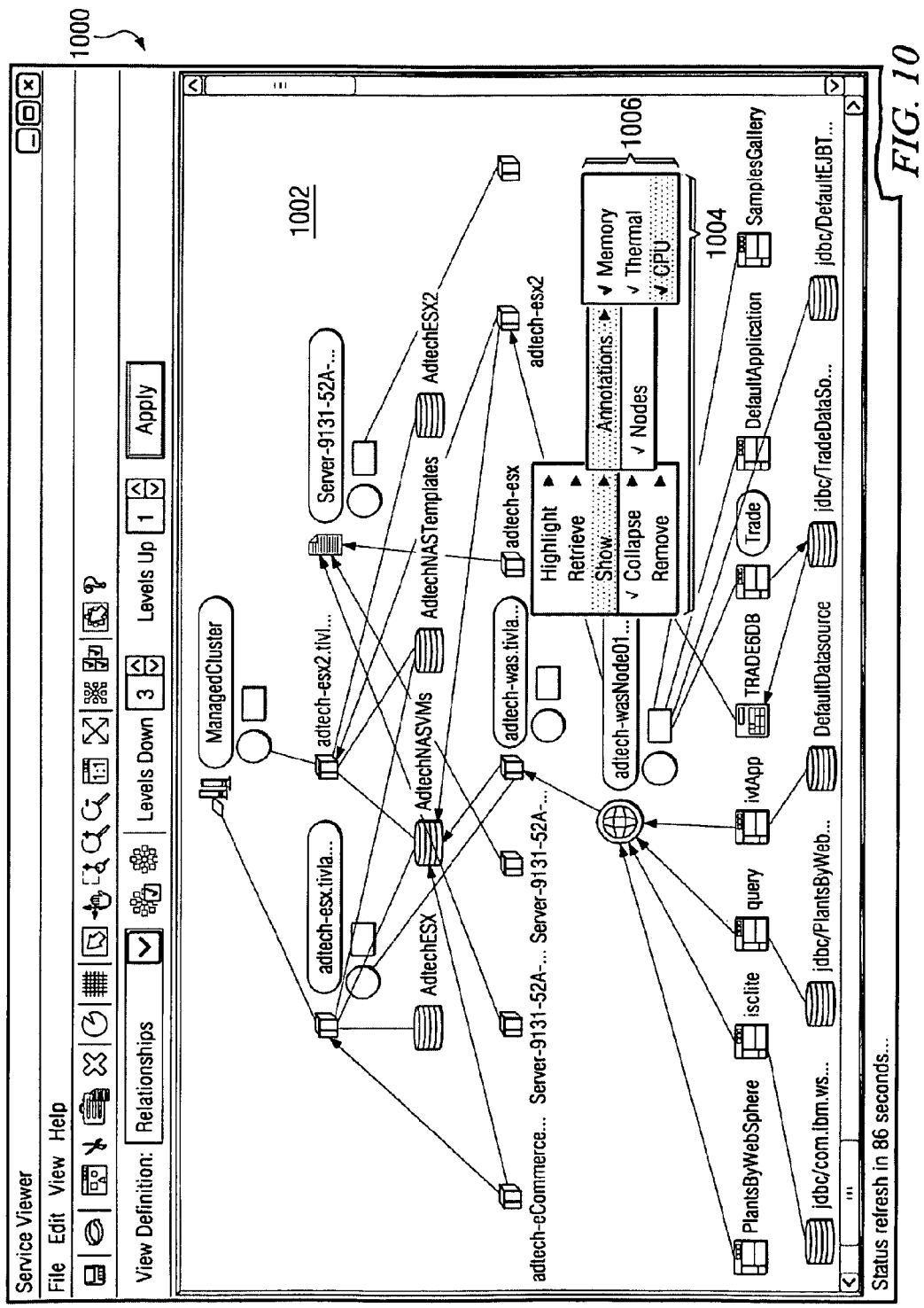

FIGS. 8-10 illustrate an exemplary system management user interface in accordance with the illustrative embodiments. In particular, user interface 800 in FIG. 8 depicts an exemplary system management graph 802 comprising a plurality of monitored resources in an enterprise system. Graph 802 displays resources provided by object model 700 in FIG. 7, including physical and non-physical resources and the relationships among these resources. The resources displayed may include, but are not limited to, clusters, hosts, data stores, virtual machines, application servers, applications, data sources, and the like.

User interface 800 provides a menu 804 that allows a user to browse and select which metric annotations are to be displayed for a selected set of resources in graph 802. Menu 804 may be displayed to the user automatically when the user selects a set of resources, or menu 804 may be displayed for the set of resources when the user right-clicks on graph 802. In either case, menu 804 displays a list of annotation options 800 (menu items) for the user to browse through and select. In one embodiment, menu 804 may comprise a drop-down menu and submenus that reflect annotation options 806 available to the set of resource items selected in graph 802.

Annotation options 800 provided in menu 804 may include annotations that reflect the values of CPU, memory, or disk usage, as well as the number of transactions flowing through, applications or temperature values to indicate the thermal health of individual computer systems represented in the graph, among other possible annotation metrics. The particular annotation options provided to the user in menu 804 are dependent on the types of resources that are selected in graph 802. For example, graph 802 shows various highlighted resources that have been selected by the user. These selected, resources include physical resources such as managed cluster 808, hosts 810, and server 812, as well as non-physical resources such as processes 814 and 816. Menu 804 comprises possible annotations available for the set of resources as a whole. Client process 504 in FIG. 5 determines the metric annotation types to display in menu 804 by traversing the object model to locate a common, superclass in foe model for all the resources currently selected in graph 802. The metrics associated with the located superclass are displayed in menu 804. In this illustrative example, as both processes and physical computer systems are selected in graph 802, menu 804 provides the user with a list of the possible annotations (e.g. CPU, memory) for this group of selected resources. However, if only physical computer systems are selected in graph 802, the annotation options provided in menu 804 may include other possible annotations, such as a thermal annotation for displaying the thermal properties of the physical resource.

FIG. 9 illustrates the updated graph 902 that displays annotations that were selected, from menu 804 in FIG. 8, for display in accordance with the illustrative embodiments. Once the user selects the annotation types from the possible annotations provided in menu 804, for the selected set of resources, graph 802 is updated to reflect the resources, relationships, and associated metric annotations. As shown, CPU usage annotations 904 and memory annotations 906 are displayed for each selected resource.

User interface 900 supports a plug-in infrastructure for registering and displaying the annotations in graph 902. In one embodiment, a percentage based plug-in may be registered for annotations whose values are represented as percentages that indicate to the user the operational status of each selected resource. The plug-in may determine the current metric value of the annotation from the object model and render the value as a percentage on graph 902. The plug-in may display the current percentage value as text. Alternatively, the plug-in may render the metric values on graph 902 as icons to pictorially represent the current operational status of the resources. The plug-in may also render metric value annotations on graph 902 in a particular color to represent the current status of the resource. For instance, if the metric value for a resource currently meets or exceeds certain, threshold conditions defined in the plug-in, colors such as green and red may be used in the annotation to represent "good" and "bad" statuses respectively. Similarly, other color coded combinations for the annotation text and/or icons may be used to indicate a resource is operating in a normal mode, a warning mode, or a critical mode.

FIG. 10 illustrates a user interface 1000 that provides a context, menu for individual resources in graph 1002 in accordance with the illustrative embodiments. Context menu and submenus 1004 may be provided to the user when the user selects an individual, resource in graph 1002. Context menu and submenus 1004 display options that reflect annotation options 1006 available to the selected resource. Context menu and submenus 1004 may be displayed to the user automatically when the user selects the resource, or context menu and submenus 1004 may be displayed for the resource when the user right-clicks on the resource. In either case, context menu and submenus 1004 display a list of annotation options 1006 for the user to browse through and select for display on graph 1002. As only an individual resource is selected in graph 1002, the user interface may provide all of the possible annotation options available to that resource.

Figure 11:
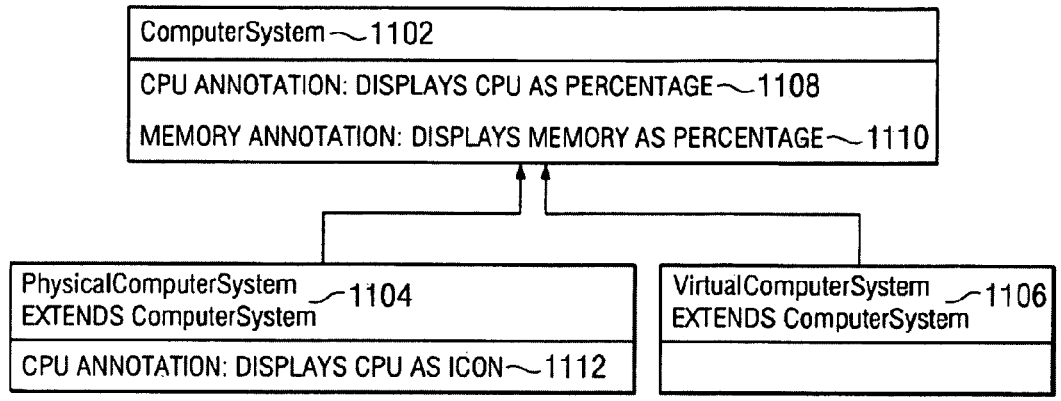
FIG. 11 is a diagram illustrating how annotations may be inherited and overridden in accordance with the illustrative embodiments.

FIG. 11 is a diagram illustrating how annotations may be inherited and overridden in accordance with the illustrative embodiments. ComputerSystem class 1102, PhysicalComputerSystem class 1104, and VirtualComputerSystem class 1106 are class objects in object model 700 in FIG. 7. In this example, PhysicalComputerSystem class 1104 and VirtualComputerSystem class 1100 are subclasses of superclass ComputerSystem class 1102. Consequently, PhysicalComputerSystem class 1104 and VirtualComputerSystem class 1100 inherit the annotations defined for ComputerSystem class 1102, in this example, CPU annotation 1108 and memory annotation 1110 are inherited from ComputerSystem class 1102.

If the user selects a virtual computer system represented in a system management graph such as system management graph 802 in FIG. 8, a menu is provided to the user to allow the user to select and enable the CPU and/or memory annotation(s) for the selected virtual computer system. Both the CPU annotation and the memory annotation are inherited from ComputerSystem class 1102 and will be displayed in the graph as percentages. If the user selects a physical computer system represented in the system management graph, a menu is also provided to the user to allow the user to select and enable CPU and/or memory annotations) for the selected physical computer system, if the user enables the memory annotation, the memory annotation is inherited from ComputerSystem class 1102 and will be displayed in the graph as a percentage. However, if the user enables the CPC annotation, the CPU annotation, will be displayed in the graph as an icon, as the CPU annotation attribute 1112 defined in PhysicalComputerSystem class 1104 has overridden the annotation attributes inherited from ComputerSystem class 1102.

Figure 12:
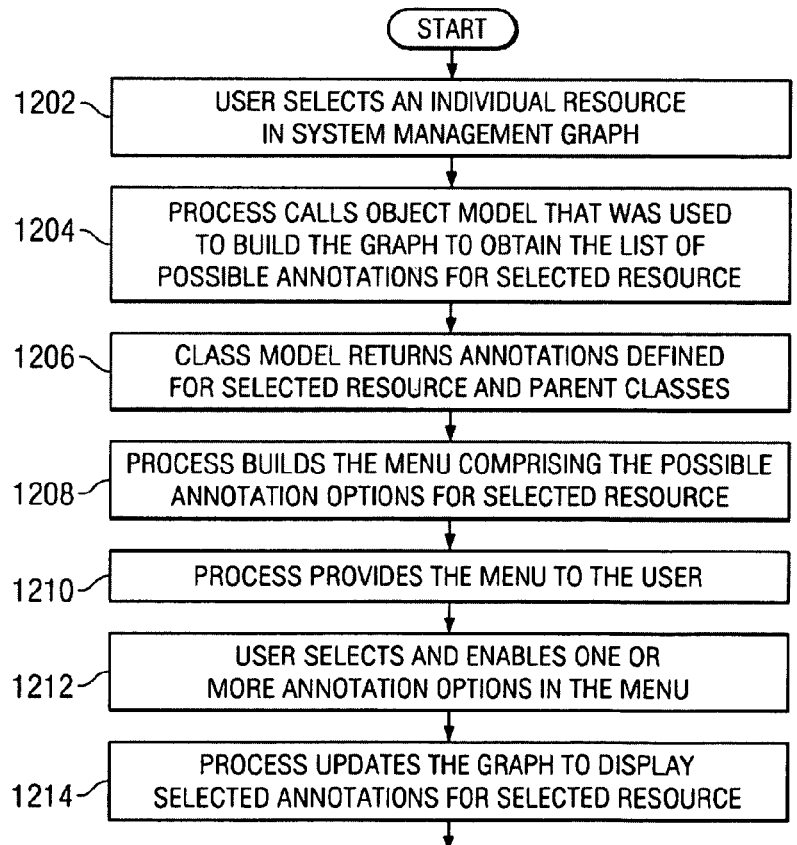
FIG. 12 is a flowchart of a process for generating annotations for display on the system management graph from selection of a single resource on the graph in accordance with the illustrative embodiments.

FIG. 12 is a flowchart of a process for generating annotations for display on the system management graph in accordance with the illustrative embodiments. The process in FIG. 12 may be implemented when a user selects a single resource on the system management graph. The process may be implemented in a data processing system such as client 500 in FIG. 5.

The process begins with the user selecting an individual resource in the system management graph (step 1202). When the resource selection is detected, the process calls the object model that was used to build the graph to obtain the list of possible annotations for the selected resource (step 1204). The class model returns the annotations defined for the selected resource and the parent classes of the selected resource to the process (step 1206). The process then builds the menu comprising the possible annotation options for the selected resource (step 1208) and provides the menu to the user (step 1210).

When the user selects and enables one or more annotation options in the menu (step 1212), the process updates the graph to display the selected annotations for the selected resource (step 1214), with the process terminating thereafter.

Figure 13:
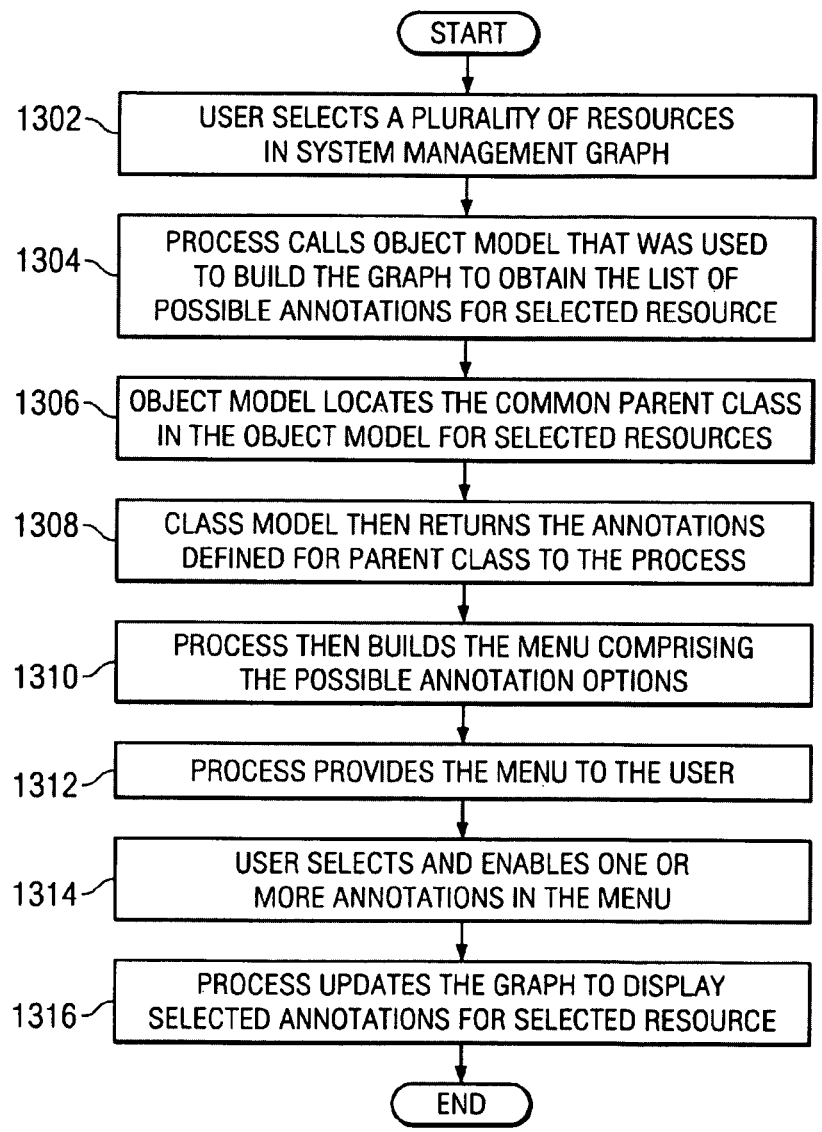
FIG. 13 is a flowchart of a process for generating annotations for display on the system management graph from selection of multiple resources on the graph in accordance with the illustrative embodiments.

FIG. 13 is a flowchart of a process for generating annotations for display on the system management graph from selection of multiple resources on the graph, in accordance with the illustrative embodiments. The process in FIG. 13 may be implemented when a user selects multiple resources on the system management graph. The process may be implemented in a data processing system such as client 500 in FIG. 5.

The process begins with the user selecting a plurality of resources in the system management graph (step 1302). As selection of the resources is detected, the process calls the object model that was used to build the graph to obtain the list of possible annotation options for the selected resources (step 1304). The object model locates the common parent, class in the object model for the selected resources (step 1306). The class model then returns the annotations defined for the parent class to the process (step 1308). The process then builds the menu comprising the possible annotation options (step 1310) and provides the menu to the user (step 1312).

As the user selects and enables one or more annotations in the menu (step 1314), the process updates the graph to display the selected annotations for the selected resources (step 1316), with the process terminating thereafter.

The flowchart and block diagrams in the figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block, may occur out of the order noted in the figures. For example, two blocks shown in succession may, in fact, be executed substantially concurrently, or the blocks may sometimes be executed in the reverse order, depending upon the functionality involved, ft will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, hut do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments in the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program, code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program, code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled, to the system to enable the data processing system to become coupled to other data processing systems or remote printers or storage devices through intervening private or public networks. Modems, cable modem and Ethernet cards are just a few of the currently available types of network adapters.

The description of the embodiments in the disclosure has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing resource-specific metric annotations in a system management graph, the computer implemented method comprising:
    detecting selection of a set of computer resources in a system management graph in a graphical user interface;
    retrieving annotation options available to the selected set of computer resources from an object model, wherein the object model defines computer resources in a data processing system and relationships among the computer resources, and wherein the annotation options represent resource metrics collected for the set of computer resources;
    creating a menu using the annotation options for the selected set of computer resources;
    displaying the menu to a user in the graphical user interface;
    responsive to detecting selection of a set of annotation options in the menu, updating the system management graph to display annotations, corresponding to the selected set of annotation options, for the selected set of computer resources to form an updated system management graph; and
    providing the updated system management graph to the user in the graphical user interface, and wherein the object model comprises a plurality of instantiated class objects associated with the selected set of resources, relationships among the plurality of instantiated class objects, and a list of annotations available for each type of class object of the plurality of instantiated class objects.

2. The method of claim 1, wherein retrieving annotation options available to the selected set of resources from an object model further comprises:
    responsive to a determination that the selected set of resources comprises a plurality of resources, locating a parent class in the object model that is common to the plurality of resources; and
    obtaining the annotation options for the common parent class.

3. The method of claim 2, wherein creating a menu using the annotation options for the selected set of resources further comprises:
    building the menu from the available annotation options for the common parent class.

4. The method of claim 1, wherein retrieving annotation options available to the selected set of resources from an object model further comprises:
    responsive to a determination that the selected set of resources comprises a single resource, locating one or more parent classes of the single resource; and
    obtaining the annotation options for the single resource and the parent classes of the single resource.

5. The method of claim 4, wherein creating a menu using the annotation options for the selected set of resources further comprises:
    building the menu from the annotation options for the single resource and the parent classes.

6. The method of claim 5, wherein creating a menu using the annotation options for the selected set of resources further comprises:
    responsive to a determination that a conflict exists between an annotation option for the individual resource and an annotation option for a parent class of the individual resource, overriding the annotation option for the parent class with the annotation option for the individual resource; and
    displaying the annotation option for the individual resource in the menu.

7. The method of claim 1, wherein the annotations represent a current operational status for each of the selected set of resources, and wherein the object model comprises a plurality of instantiated class objects associated with the selected set of resources, relationships among the plurality of instantiated class objects, and a list of annotations available for each type of class object of the plurality of instantiated class objects.

8. The method of claim 7, wherein the annotations indicate whether the current operational status of a resource has exceeded one or more threshold levels.

9. The method of claim 7, wherein the annotations are color-coded to represent a current operational status of a resource.

10. The method of claim 7, wherein the annotations comprise at least one of text, icons, or percentage values displayed in the system management graph.

11. The method of claim 1, wherein the annotations represent at least one of central processing unit usage, memory usage, disk usage, number of received transactions, or thermal health of an individual computer system.

12. An apparatus comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to detect selection of a set of computer resources in a system management graph in a graphical user interface; retrieve annotation options available to the selected set of computer resources from an object model, wherein the object model defines computer resources in a data processing system and relationships among the computer resources, and wherein the annotation options represent resource metrics collected for the set of computer resources; create a menu using the annotation options for the selected set of computer resources; display the menu to a user in the graphical user interface; update, in response to detecting selection of a set of annotation options in the menu, the system management graph to display annotations, corresponding to the selected set of annotation options, for the selected set of computer resources to form an updated system management graph; and provide the updated system management graph to the user in the graphical user interface, and wherein the object model comprises a plurality of instantiated class objects associated with the selected set of resources, relationships among the plurality of instantiated class objects, and a list of annotations available for each type of class object of the plurality of instantiated class objects.

13. A computer program product comprising a non-transitory computer storage medium having computer usable program code stored thereon, the computer usable program code for execution by a computer, comprising:

computer usable program code for detecting selection of a set of computer resources in a system management graph in a graphical user interface;

computer usable program code for retrieving annotation options available to the selected set of computer resources from an object model, wherein the object model defines computer resources in a data processing system and relationships among the computer resources, and wherein the annotation options represent resource metrics collected for the set of computer resources;

computer usable program code for creating a menu using the annotation options for the selected set of computer resources;

computer usable program code for displaying the menu to a user in the graphical user interface;

computer usable program code for updating, in response to detecting selection of a set of annotation options in the menu, the system management graph to display annotations, corresponding to the selected set of annotation options, for the selected set of computer resources to form an updated system management graph; and computer usable program code for providing the updated system management graph to the user in the graphical user interface, and wherein the object model comprises a plurality of instantiated class objects associated with the selected set of resources, relationships among the plurality of instantiated class objects, and a list of annotations available for each type of class object of the plurality of instantiated class objects.

14. The computer program product of claim 13, wherein the computer usable program code for retrieving annotation options available to the selected set of resources from an object model further comprises:

computer usable program code for locating, in response to a determination that the selected set of resources comprises a plurality of resources, a parent class in the object model that is common to the plurality of resources; and computer usable program code for obtaining the annotation options for the common parent class.

15. The computer program product of claim 14, wherein the computer usable program code for creating a menu using the annotations options for the selected set of resources further comprises:

computer usable program code for building the menu from the available annotation options for the common parent class.

16. The computer program product of claim 13, wherein the computer usable program code for retrieving annotation options available to the selected set of resources from an object model further comprises:

computer usable program code for locating, in response to a determination that the selected set of resources comprises a single resource, one or more parent classes of the single resource; and computer usable program code for obtaining the annotation options for the single resource and the parent classes of the single resource.

17. The computer program product of claim 16, wherein the computer usable program code for creating a menu using the annotation options for the selected set of resources further comprises:

computer usable program code for building the menu from the annotation options for the single resource and the parent classes;

computer usable program code for overriding, in response to a determination that a conflict exists between an annotation option for the individual resource and an annotation option for a parent class of the individual resource, the annotation option for the parent class with the annotation option for the individual resource; and computer usable program code for displaying the annotation option for the individual resource in the menu.

18. The computer program product of claim 17, wherein the object model comprises a plurality of instantiated class objects associated with the selected set of resources, relationships among the plurality of instantiated class objects, and a list of annotations available for each type of class object of the plurality of instantiated class objects.

19. The computer program product of claim 13, wherein the computer usable program code is stored in a computer readable storage medium in a data processing system, and wherein the computer usable program code is downloaded over a network from a remote data processing system.

20. The computer program product of claim 13, wherein the computer usable program code is stored in a computer readable storage medium in a server data processing system, and wherein the computer usable program code is downloaded over a network from a remote data processing system for use in a computer readable storage medium with the remote system.

* * * * *